(12) United States Patent
Barclay

(10) Patent No.: US 7,194,735 B2
(45) Date of Patent: Mar. 20, 2007

(54) EXECUTING NATIVE CODE IN PLACE OF NON-NATIVE CODE

(75) Inventor: Brad J. Barclay, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 552 days.

(21) Appl. No.: 10/235,598

(22) Filed: Sep. 5, 2002

(65) Prior Publication Data

US 2004/0015972 A1    Jan. 22, 2004

(30) Foreign Application Priority Data

Mar. 12, 2002    (CA) .................................. 2376327

(51) Int. Cl.
*G06F 9/45* (2006.01)
(52) U.S. Cl. .................... 717/148; 717/136; 717/159
(58) Field of Classification Search ................ 717/114, 717/118–119, 136–141, 145–148, 171, 159; 718/1, 100, 102
See application file for complete search history.

(56) References Cited

U.S. PATENT DOCUMENTS

| | | | | |
|---|---|---|---|---|
| 5,751,892 A | * | 5/1998 | Hirayama et al. | ............ 386/92 |
| 5,768,593 A | | 6/1998 | Walters et al. | |
| 5,974,256 A | | 10/1999 | Matthews et al. | |
| 6,091,897 A | | 7/2000 | Yates et al. | |
| 6,282,702 B1 | * | 8/2001 | Ungar | ......................... 717/148 |
| 6,308,315 B1 | * | 10/2001 | Dice et al. | ................... 717/106 |
| 6,513,156 B2 | * | 1/2003 | Bak et al. | .................... 717/151 |
| 6,820,252 B2 | * | 11/2004 | Sakamoto et al. | .......... 717/136 |
| 6,907,519 B2 | * | 6/2005 | Desoli | ........................ 712/227 |
| 2002/0144240 A1 | * | 10/2002 | Lueh et al. | .................. 717/136 |

OTHER PUBLICATIONS

Microsoft Computer Dictionary Fifth Edition, p. 216, definition for 'flag', 2002 by Microsoft Corporation.*

* cited by examiner

*Primary Examiner*—Wei Zhen
*Assistant Examiner*—Mary Steelman
(74) *Attorney, Agent, or Firm*—Stephen J. Walder, Jr.; Jeffrey S. LaBaw

(57) ABSTRACT

A code execution mechanism is provided which can direct a data processing system to execute native code in place of executing non-native code, in which the native code is functionally equivalent to the non-native code. The data processing system is operatively coupled to a computer readable memory for storing the functionally equivalent native code and for storing the non-native code. The code execution mechanism directs the data processing system to identify presence of the native code when the native code functionally corresponds with a portion of non-native code, and directs the data processing system to execute the native code in place of the non-native code if the presence of the native code is identified. When non functionally equivalent native code is identified, the data processing system executes the non-native code.

18 Claims, 2 Drawing Sheets

EXECUTING NATIVE CODE IN PLACE OF NON-NATIVE CODE

FIELD OF THE INVENTION

The present invention relates to the execution of computer program code, and more specifically to the execution of native code in place of non-native code.

BACKGROUND

Native code is a type of code compiled for direct execution by a given type of central processing unit (CPU). For example, a compiler reads computer programmed instructions written in a computer programming language (such as FORTRAN) to generate native code that is directly executable by a brand-specific CPU. Unfortunately, native code (i.e., it is non-portable) compiled for one type of CPU cannot be executed by another type of CPU. For each type of CPU, the computer programmed instructions must be recompiled to generate native code for execution by or on that type of CPU.

Non-native code, on the other hand, is not directly executed by a CPU. An intermediate program is used to execute non-native code. In turn, the intermediate program is directly executed by the CPU. In this sense, the CPU indirectly executes non-native code. An example of an intermediate program is a Java™ virtual machine (supplied by Sun Microsystems of California, USA) which is used for directly executing computer programmed instructions written in Java™. Once a CPU directly executes the virtual machine, then the executing virtual machine directly executes non-native code. Functionally, the virtual machine is a type of translator for reading non-native code and for generating native code for direct execution by the CPU. The advantage of non-native code is that it can be indirectly executed by many different types of CPUs provided that each type of CPU is executing a corresponding virtual machine designed to be used with that specific type of CPU. A disadvantage associated with executing non-native code is that the time required to execute non-native code is greater than the time required to execute a corresponding unit of native code.

Accordingly, a system that addresses, at least in part, these and other shortcomings is desirable.

SUMMARY

An embodiment of the present invention provides a code execution mechanism for directing a central processing unit (CPU) to execute native code in place of executing non-native code. The code execution mechanism of the invention directs the CPU to identify presence of native code when the native code functionally corresponds with a portion of non-native code, and directs the CPU to the native code when the presence of the native code is identified. When there is no functionally equivalent native code, the CPU executes the non-native code.

With the present invention, functionally equivalent native code may be created whenever it is determined that it may not be advantageous to indirectly execute a portion (or portions) of non-native code because the particular type of CPU may require a significant amount of processing time to indirectly execute the portion of non-native code.

In one aspect of the present invention, there is provided a method for use by a central processing unit (CPU) indirectly executing modules of non-native code, including determining that a module of native code functionally equivalent to one of the modules of non-native code is available, and adapting the CPU to directly execute the module of native code in place of indirectly executing the one of the modules of non-native code.

In another aspect of the present invention, there is provided a computer program product for use in a computer system operatively coupled to a computer readable memory, the computer program product including a computer-readable data storage medium tangibly embodying computer readable program instructions for directing the computer to implement the method of the embodiment described in the previous paragraph.

In yet another aspect of the present invention, there is provided a mechanism for use by a central processing unit (CPU) indirectly executing modules of non-native code, including means for determining availability of a module of native code functionally equivalent to one of the modules of non-native code, and means for adapting the CPU to directly execute the module of native code in place of indirectly executing the one of the identified module of non-native code.

In yet another aspect of the present invention, there is provided a computer program product for use in a computer system operatively coupled to a computer readable memory, the computer program product including a computer-readable data storage medium tangibly embodying computer readable program instructions for directing the computer to implement the mechanism of the embodiment described in the previous paragraph.

A better understanding of these and other embodiments of the present invention can be obtained with reference to the following drawings and description of the preferred embodiments.

DESCRIPTION OF THE DRAWINGS

The embodiments of the present invention will be explained by way of the following drawings in which.

DETAILED DESCRIPTION

Figure 1:
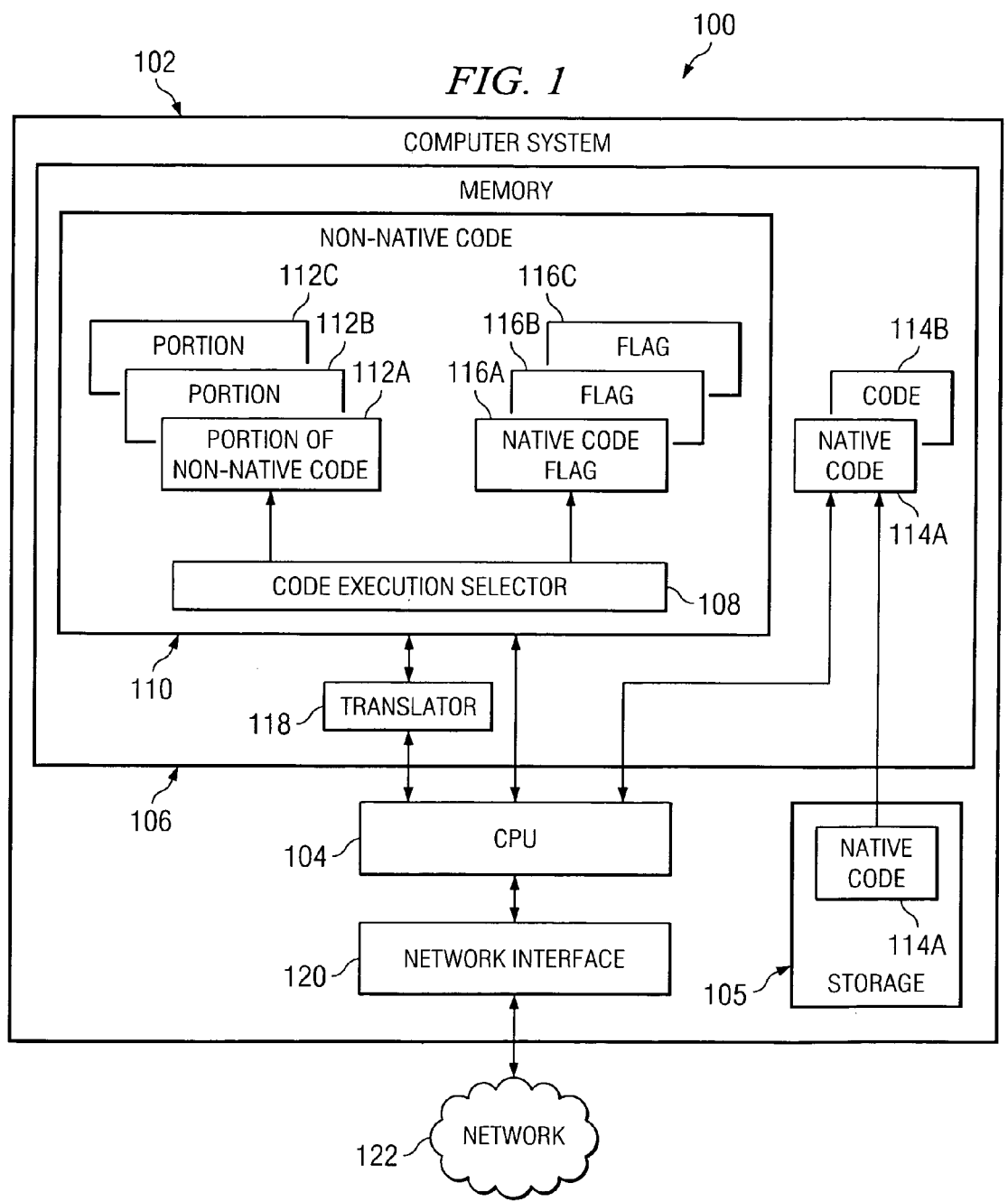
FIG. 1 depicts a computing environment.

FIG. 1 depicts a computing environment 100 having computer system 102 including computer components such as a central processing unit (CPU) 104 operatively connected to memory 106 and storage 105. In a preferred embodiment, CPU 104 is also operationally connected to network interface 120 which is operatively coupled to network 122.

Stored in memory 106 is non-native code 110 having portions 112A, 112B, 112C of non-native code which will be executed in a serial manner so that portion 112A is executed first, portion 112B is executed second, and portion 112C is executed last.

Non-native code 110 may be constructed by a user of a computer system 102 or may be received, for example, via network 122. Prior to executing non-native code 110, the user may use known methods to ascertain the execution time required to execute non-native code 110 on computer system 102, and to ascertain the execution time required to execute portions 112A, 112B, 112C of non-native code 110. In doing so, the user may ascertain that portions 112A, 112B of non-native code 110 require a significant amount of processing time when executed by CPU 104. For this case, the user may consider it advantageous to construct or obtain modules 114A, 114B of native code that are functionally equivalent to portions 112A, 112B so that the modules 114A, 114B of native code can be executed by the CPU 104 in place of the CPU executing the portions 112A, 112B of non-native code 110. It would be advantageous to exchange execution of native code for non-native code because modules 114A, 114B execute much faster than corresponding portions 112A, 112B. Initially, modules 114A, 114B are placed in storage 105 such as a hard disk drive (module 114B is not depicted as being initially placed in storage 105). To allow for selective execution of native code, native code is provisioned with a code execution selector 108 and a flag 116A, 116B, 116C is associated with each portion of the non-native code. Once a command to load modules 114A, 114B of native code to memory 106 is performed, code execution selector 108 sets native code flags (that is, indicators) 116A, 116B to indicate or identify the presence of modules 114A, 114B stored or placed in memory 106. It will be appreciated that modules 114A, 114B can be generated by a user or can be obtained via the network 122.

Before portions 112C, 112B, 112C are potentially executed, code execution selector 108 includes instructions for directing CPU 104 to load modules 114A, 114B of native code from storage 105 to memory 106 once non-native code 110 is initially executed. An example of software for loading a module of native code is that provided by the Java™ programming language for loading or storing a library to memory 106. The user can insert the software (in the non-native code) for loading the modules of native code to memory if the user determines that there is an advantage to having the CPU 104 execute the loaded modules 114A, 114B of native code in place of having the CPU 104 execute portions 112A, 112B of non-native code corresponding the loaded modules 114A, 114B of native code. Once the modules of native code have been loaded to memory, code execution selector 108 sets the indicators or flags 116 for indicating the presence of modules of native code stored in memory 106.

Native code flags 116A, 116B, 116C are part of the non-native code 110. Flags 116A, 116B, 116C are associated with portions 112A, 112B, 112C of non-native code respectively. Flags 116A, 116B are set (for example, a bit that is set to '1') to identify the presence of modules of native code 114A, 114B respectively which are stored in memory 106. Flag 116C is not set (for example, a bit that is set to '0') to identify any portion or module of equivalent native code stored in memory 106 (that is, native code is not stored in memory 106 which is identified with flag 116C). Modules 114A, 114B of native code are functionally equivalent to portions 112A, 112B of non-native code respectively. Flags 116A, 116B identify presence of modules 114A, 114B of native code stored in the memory 106 that are functionally equivalent to portions 112A, 112B.

Translator 118 is also stored in memory 106. Translator 118 is a program for directly executing non-native code 110. Translator 118 is directly executable by CPU 104. Non-native code 110 indirectly executed by CPU 104 executing translator 118 while the translator 118 directly executes non-native code 110. An example of translator 118 is a Java™ virtual machine used for directly executing Java™ code (which is an example of non-native code).

Contained in non-native code 110 is code execution selector 108 which is a mechanism for directing or causing the CPU 104 to execute a module of native code in place of indirectly executing a portion of non-native code if code execution selector can determine whether modules of native code are present in memory 106. When non-native code 110 is executed by translator 118, code execution selector 108 identifies or determines which portion of non-native code is to be executed by the translator 118. For the case when code execution selector 108 determines that portion 112A is the next non-native code available for execution, code execution selector 108 examines a flag 116A corresponding to portion 112A to determine whether a module of native code functionally equivalent to portion 112A is stored in memory 106. If flag 116A is set to identify presence of a functionally equivalent module of native code, code execution selector 108 sends a request to CPU to execute module 114A; then, when module 114A has completed execution, control passes back to code execution selector 108 so that other portions of non-native code can be executed. Code execution selector 108 proceeds to identify the next portion of non-native code to be executed and the process is repeated for subsequent portions of non-native code identified for execution.

For the case when flag 116B indicates presence of module 114B in memory 106 to code execution selector 108, code execution selector 108 bypasses execution of portion 112B by requesting CPU 104 execute module 114B. When execution of module 114B is completed, control passes back to code execution selector 108. For the case when flag 116C indicates no presence of any module that is functionally equivalent (that is, functionally equivalent to portion 112C), code execution selector 108 allows translator 118 to execute portion 112C. The mechanism for directing CPU 104 to execute modules 114A, 114B and return control back to selector 108 is known in the art. In this regard "Java™ Native Interface: Programmer's Guide and Specification" by Sheng Liang published by Addison Wesley in 1990 (ISBN#: 0201325772) is incorporated by reference for details of the mechanism used in Java™ for directing a CPU to execute native code and return control back to a translator upon completed execution of the native code. The correspondence or assignment for relating a portion of non-native code to a module of native code is handle by the translator's library loader (that is, this is part of the Java™ programming language JNI specification which is documented in the publication cited above). The present invention uses existing library loading mechanisms in combination with other elements for allowing optional native code replacement.

Figure 2:
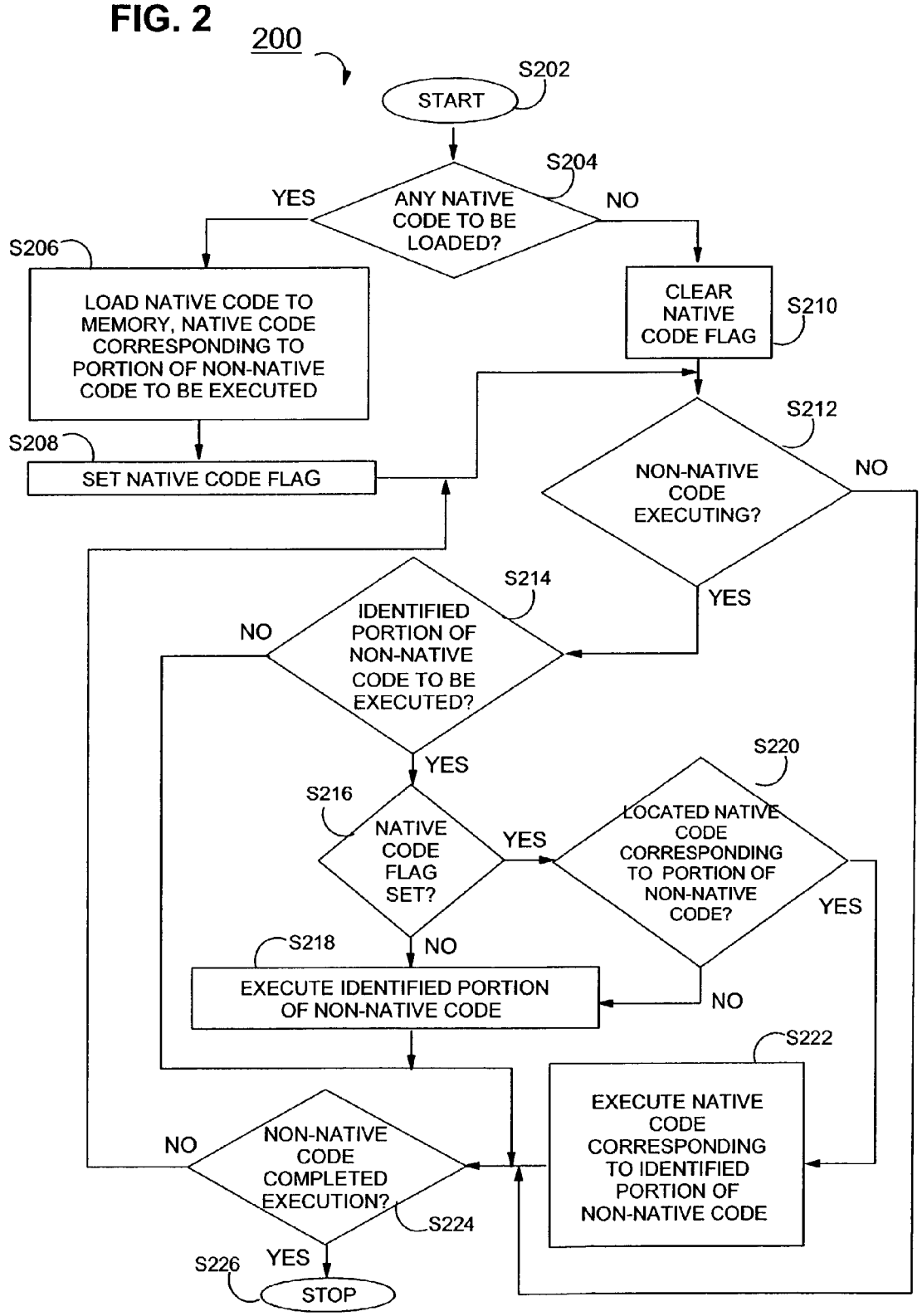
FIG. 2 depicts operations of the computing environment of FIG. 1.

FIG. 2 depicts operation 200 of the computing environment 100 of FIG. 1. Operation 200 is performed by code execution selector 108 unless stated otherwise.

S202 indicates the beginning of operation of code execution selector 108. In S204, execution code selector 108 ascertains whether there is any module of native code to be loaded into memory 106 (such as module 114A). For the case when there is a module of native code to be loaded to memory 106, operation continues to S206 in which case the module of native code is loaded to memory 106. For example, module 114A functionally corresponds or is equivalent to portion 112A (in that module 114A can be executed in place of executing portion 112A). In S208, the native code flag 116A is set to indicate presence of module 114A in memory 106, and processing continues to S212. For the case when there are no modules of native code loaded to memory, operation continues to S210 in which a native code flag is cleared to indicate non-presence of an equivalent module of native code stored in memory 106. An iterative stage can be placed in this operation for iteratively identifying modules of native code stored to memory and setting corresponding flags or indicators to indicate presence of modules in memory 106.

In S212, code execution selector 108 ascertains whether non-native code is currently being executed by translator 118. For the case when there are no portions of non-native code to be executed, processing continues to S224. For the case when non-native code is to be executed by translator 118, then processing continues to S214.

In S214, code execution selector 108 ascertains or identifies whether a portion of non-native code is to be executed by translator 118. For example, in an iteratively executed operation of S214, code execution selector 108 ascertains or identifies that portion 112A is to be executed. For other iteratively executed operations of S214, portions 112B, 112C are identified as a portion of non-native code to be executed. For the case when there is no portion of non-native code to be executed, processing continues to S224. For the case when there is a portion of non-native code (such as portions 112A, 112B, or 112C) to be executed by translator 118, processing continues to S216.

In S216, code execution selector 108 ascertains whether a native code flag is set to indicate presence of a module of native code corresponding to the flag (the module is loaded in memory 106). For a first, second, and third iteration of operation S216, flags 116A, 116B, and 116C are respectively is identified. If a flag is not set (indicating that there is not an equivalent module of native code) for the current iterative operation of S216, processing continues to S218. For the case when a flag indicates a module of native code is present and stored in memory, processing continues to S220.

In S218, code execution selector 108 requests translator 118 to execute the identified portion of non-native code (such as portion 112C) because there was no corresponding module of native code loaded to memory 106. An example would be when portion 112C is identified but flag 112C indicates no equivalent code is loaded to memory, and then portion 112C will be executed by translator 118.

In S220, code execution selector 108 may request translator to locate or determine presence of module of native code corresponding to identified portion 112. For the case when a corresponding module of native code is not located, processing continues to S218 in which the portion of non-native code is executed. For the case when a module of corresponding native code is located, processing continues to S222.

In S218, the identified portion of non-native code is executed because translator could not located or determine presence of corresponding native code loaded to memory 106.

In S222, code execution selector 108 requests translator 118 to request CPU 104 to execute a module of native code if the corresponding flag was set. In a first and second iteration of operation S222, translator 118 will request CPU 104 to execute module 114A and 114B respectively as a result of code execution selector 108 examining respective flags 116A, 116B and finding them set. Once modules 114A, 114B are executed, processing control is passed back to the code execution selector 108 in a manner known to persons having ordinary skill in the art.

In S224, code execution selector 108 determines whether there are other portions of non-native code to be executed. For the case when no other portions of non-native code can be executed, processing continues to S226 (in which S226 indicates end of operations of code execution selector 118). For the case when other portions of non-native code have not yet executed, processing returns to S212 so that code execution selector 108 may iteratively detect other portions of non-native code to be executed.

An advantage of automatic execution of native code corresponding to a portion of non-native code is to improve the possibility of increasing the speed of execution for a desired computational task. Typically, non-native code executes more slowly than native code on a type of CPU because the native code has been specifically compiled for execution on the type of CPU, in sharp contrast to the portion of non-native code which is not specifically made to execute quickly on any type of CPU.

The Appendix provides an example of pseudo code for implementing an embodiment of the present invention in Java code.

The present invention may be embodied in other specific forms without departing from the spirit or essential characteristics thereof. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

The Appendix provides an example of pseudo code for implementing an embodiment of the present invention in Java™ code.

```
/* InventionExample.Java */
/* This is an example of */
/* selective native code execution */
public class Invention example {
// The following statement defines a flag used to store the
// state of native library initialization, which will be used
     later
// to determine whether or not to execute a portion of
     non-native
// code (Java) or to execute a module of native code
     corresponding
// to the portion of non-native code.
private static boolean is NativeCodeAvailable;
// The following statement holds the name of the native
// library (a portion of native code).
// Java will append to this name any applicable library
     name
// extension as is standard for the operating system in use
// (i.e., on Windows and/or OS/2, it will use NAME.DLL)
// (i.e., on Linux, it will use NAME.so, etc.)
private         static         String
     NATIVE_LIBRARY_NAME="NATIVELIB";
// The following block of code is executed whenever this
     class is
// instantiated (i.e., when this class is run directly, or when
     it is first
// used by some other executable class, or whenever the
     runtime
// environment is asked to initialize the class). This is the
     block
// that determines whether or not the native library is
     loadable.
static {
// This is the first block of code that executes regardless
     of whether
// non-native code or native code is to be executed. (1) (A)
// This code attempts to load the library. It is works, the
     native
// code flag is set to 'TRUE' to signify that the native
     equivalent
// should be executed in place of executing the non-native
     code
try {
     System.loadLibrary (NATIVE_LIBRARY_NAME);
```

```
        IsNativeCodeAvailable=true;
    }/* end try */
// The code reaches this point if the attempt to load the
    library fails.
// In this case, the native code flag set to 'FALSE'.
    catch (Throwable t) {
        is NativeCodeAvailable=false;
    }/* end catch */
}/* end static */
// The following block of code is the execution entry point
    for
// this program if this class is run using the "java"
    command line utility.

public static final void main(String args[ ]) {

// This is the second block of code that executes regardless
    of whether
// non-native code or native code is to be executed. (2) (B)
// A call is made to the example method that may execute
    either native or
// non-native code depending on the state of the isNative-
    CodeAvailable flag.
    doHelloWorld ( );
} // end main method
// Programs will call this method to do a task or piece of
    work.
// This is the code for determining whether native or
    non-native code
// is to be executed.
public static void doHelloWorld( ) {
// This is the third block of code that executes regardless
    of whether
// non-native code or native code is to be executed. (3) (C)
    if (isNativeCodeAvailable) {
        // If the native library was loaded, try running the native
            version.
        try {
            doHelloWorldNative( );
        }/* end try */
// This portion was reached because calling this method
    didn't work.
// This can happen if the library exists, but doesn't
    implement
// the native version of the desired method.
// For this case, the non-native version is executed instead.
        catch (UnsatisfiedLinkError ulel) {
            doHelloWorldNonNative ( );
        } /* end catch */
    } else {
// Since a native library is not executed, run or execute
// the non-native version.
        doHelloWorldNonNative ( );
    }/* end if */
}// end-static-method
// This is the non-native implementation of the method
    that is called.
// Being a simple example, it only displays "Hello World!"
// to a standard computer display.
private static void doHelloWorldNonNative( ) {
// This is the last block of code that executes only if
    non-native code
// is being executed. (4)
    System.out/println ("Hello World!");
} /* end static method */
// This is the definition for the native version of the
    method.
// Note that the implementation would live in a library that
// complies with Java's JNI (Java Native Interface) speci-
    fication,
// thus an implementation is not specified here. Instead
// the code tells that the method is native so it can look for
/ it in all loaded native libraries instead.
    private static native void doHelloWorldNative( );
// This is the last block of code that executes only if native
    code
// is being executed. (D)
} /* end class */
```

The embodiments of the invention in which an exclusive property or privilege is claimed are defined as follows:

1. A method for use by a data processing system executing non-native code modules, comprising:
   executing non-native code having a plurality of non-native code modules;
   loading one or more native code modules into memory of the data processing system; and
   executing a code execution selector provided in the non-native code, wherein the code execution selector:
   determines if a native code module in the one or more native code modules, functionally equivalent to a non-native code module in the plurality of non-native code modules, is available,
   adapts said non-native code to execute said native code module in place of executing said non-native code module by setting a flag condition, associated with the non-native code module, which indicates whether a native code module that is functionally equivalent to that non-native code module is available, and, during execution of the non-native code:
   determines a next non-native code module to be executed,
   examines a flag condition associated with the next non-native code module to be executed, and
   instructs the data processing system to execute a native code module loaded in memory that is functionally equivalent to the next non-native code module if the flag condition is set, and wherein the data processing system returns control to the code execution selector after executing the native code module that is functionally equivalent to the next non-native code module, such that another non-native code module of the non-native code may be executed.

2. The method of claim 1 wherein said non-native code modules are directly executable by a virtual machine.

3. The method of claim 1 further comprising directing said data processing system to execute said native code module.

4. The method of claim 1 wherein said determining includes:
   attempting to load said native code module functionally equivalent to said one of said non-native code modules; and
   setting said flag where said loading is successful.

5. The method of claim 1, wherein the step of determining is performed for a non-native code module in response to a code selector determining that the non-native code module is a next non-native code module to be executed.

6. The method of claim 1, wherein if the flag condition indicates that a native code module that is functionally equivalent to that non-native code module is not available, the non-native code module is executed.

7. An apparatus for use by a data processing system indirectly executing non-native code modules, comprising:
   means for executing non-native code having a plurality of non-native code modules;

means for loading one or more native code modules into memory of the data processing system; and means for executing a code execution selector provided in the non-native code, wherein the code execution selector:

determines availability of a native code module in the one or more native code modules, functionally equivalent to a non-native code module in the plurality of non-native code modules, adapts said non-native code to execute said native code module in place of executing said non-native code module by setting a flag condition, associated with the non-native code module, which indicates whether a native code module that is functionally equivalent to that non-native code module is available, and, during execution of the non-native code:

determines a next non-native code module to be executed, examines a flag condition associated with the next non-native code module to be executed, and instructs the data processing system to execute a native code module loaded in memory that is functionally equivalent to the next non-native code module if the flag condition is set, and wherein the data processing system returns control to the code execution selector after executing the native code module that is functionally equivalent to the next non-native code module, such that another non-native code module of the non-native code may be executed.

8. The apparatus of claim 7 wherein said non-native code modules are directly executable by a virtual machine.

9. The apparatus of claim 7 further comprising means for directing said data processing system to execute said native code module.

10. The apparatus of claim 7 wherein said means for determining includes:

means for attempting to load said native code module functionally equivalent to said one of said non-native code modules; and means for setting said flag where said loading is successful.

11. The apparatus of claim 7, wherein the means for determining operates on a non-native code module in response to a code selector determining that the non-native code module is a next non-native code module to be executed.

12. The apparatus of claim 7, wherein if the flag condition indicates that a native code module that is functionally equivalent to that non-native code module is not available, the data processing system executes the non-native code module.

13. A computer program product in a computer readable medium for executing non-native code modules in a data processing system, comprising:

means for executing non-native code having a plurality of non-native code modules;

means for loading one or more native code modules into memory of the data processing system; and means for executing a code execution selector provided in the non-native code, wherein the code execution selector:

determines if a native code module in the one or more native code modules, functionally equivalent to a non-native code module in the plurality of non-native code modules is available, adapts said non-native code to execute said native code module in place of executing said non-native code module by setting a flag condition, associated with the non-native code module, which indicates whether a native code module that is functionally equivalent to that non-native code module is available, and, during execution of the non-native code:

determines a next non-native code module to be executed, examines a flag condition associated with the next non-native code module to be executed, and instructs the data processing system to execute a native code module loaded in memory that is functionally equivalent to the next non-native code module if the flag condition is set, and wherein the data processing system returns control to the code execution selector after executing the native code module that is functionally equivalent to the next non-native code module, such that another non-native code module of the non-native code may be executed.

14. The computer program product as recited in claim 13 wherein the non-native code modules are directly executable by a virtual machine.

15. The computer program product as recited in claim 13 further comprising means for directing said data processing system to execute said native code module.

16. The computer program product as recited in claim 13 wherein the means for determining includes:

means for attempting to load said native code module functionally equivalent to said one of said non-native code modules; and means for setting said flag where said loading is successful.

17. The computer program product of claim 13, wherein the means for determining operates on a non-native code module in response to a code selector determining that the non-native code module is a next non-native code module to be executed.

18. The computer program product of claim 13, wherein if the flag condition indicates that a native code module that is functionally equivalent to that non-native code module is not available, the non-native code module is executed.

* * * * *